Dec. 9, 1958 G. E. ARMINGTON 2,863,234
TWO SPEED STEERING
Filed Sept. 14, 1954 7 Sheets-Sheet 1
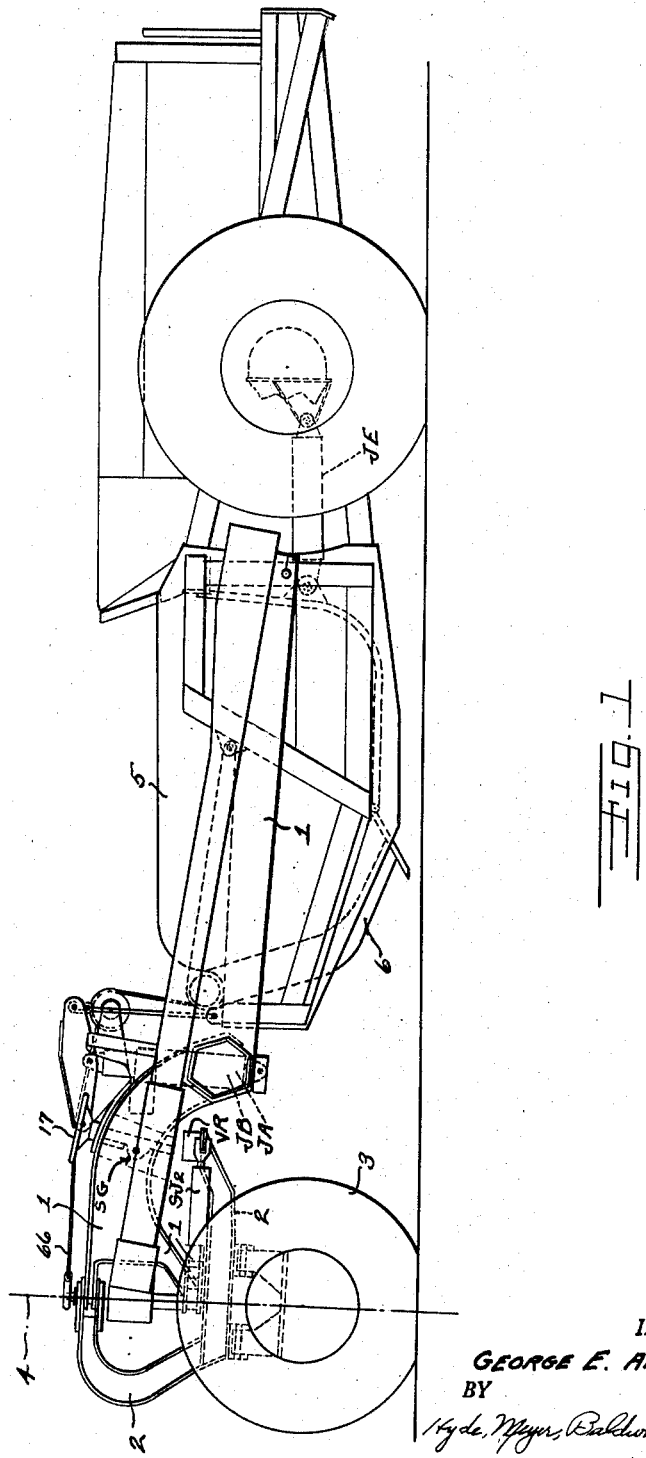
INVENTOR.
GEORGE E. ARMINGTON
BY
ATTORNEYS Dec. 9, 1958     G. E. ARMINGTON     2,863,234
TWO SPEED STEERING
Filed Sept. 14, 1954     7 Sheets-Sheet 2
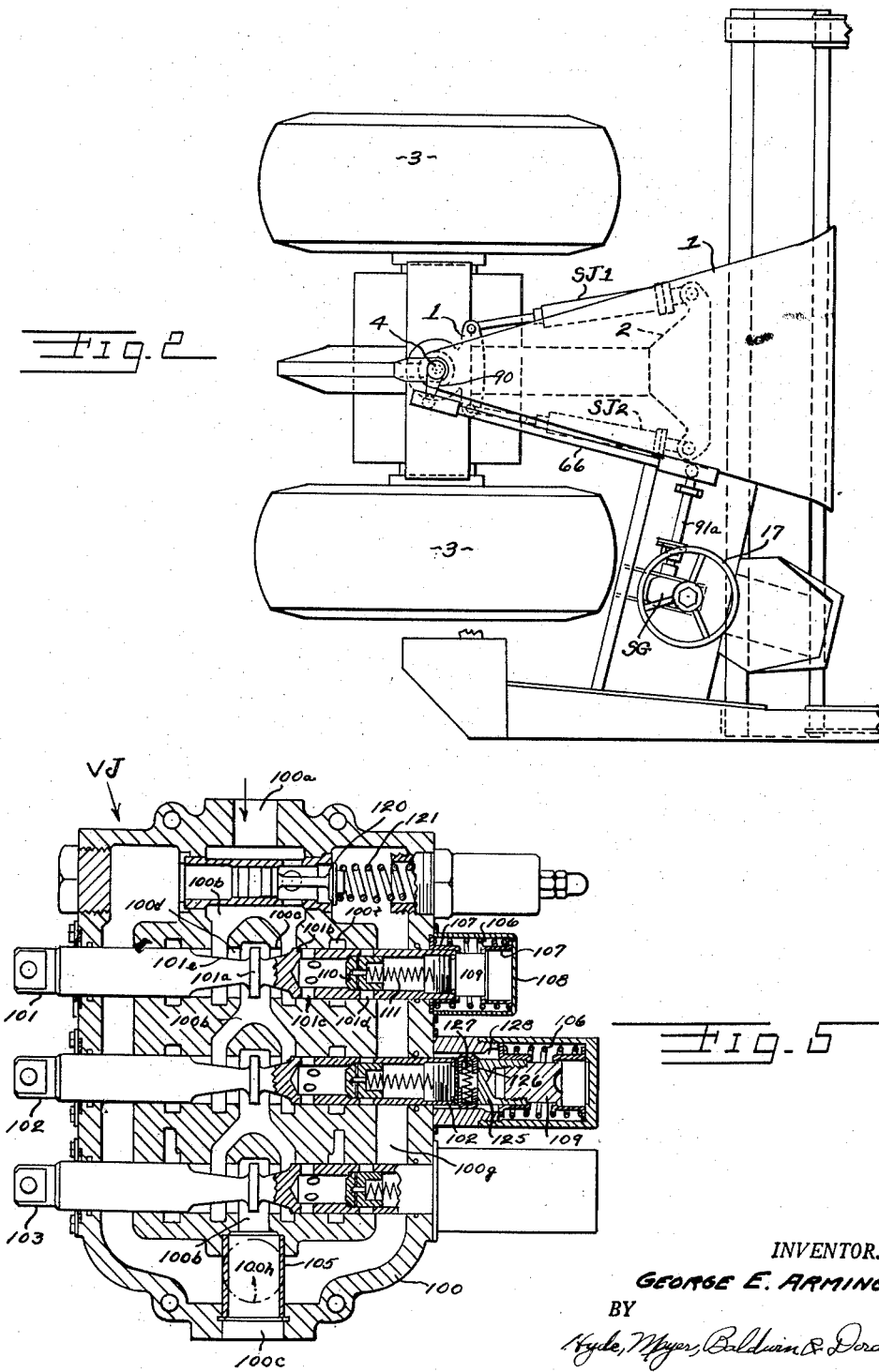
INVENTOR.
GEORGE E. ARMINGTON
BY
ATTORNEYS

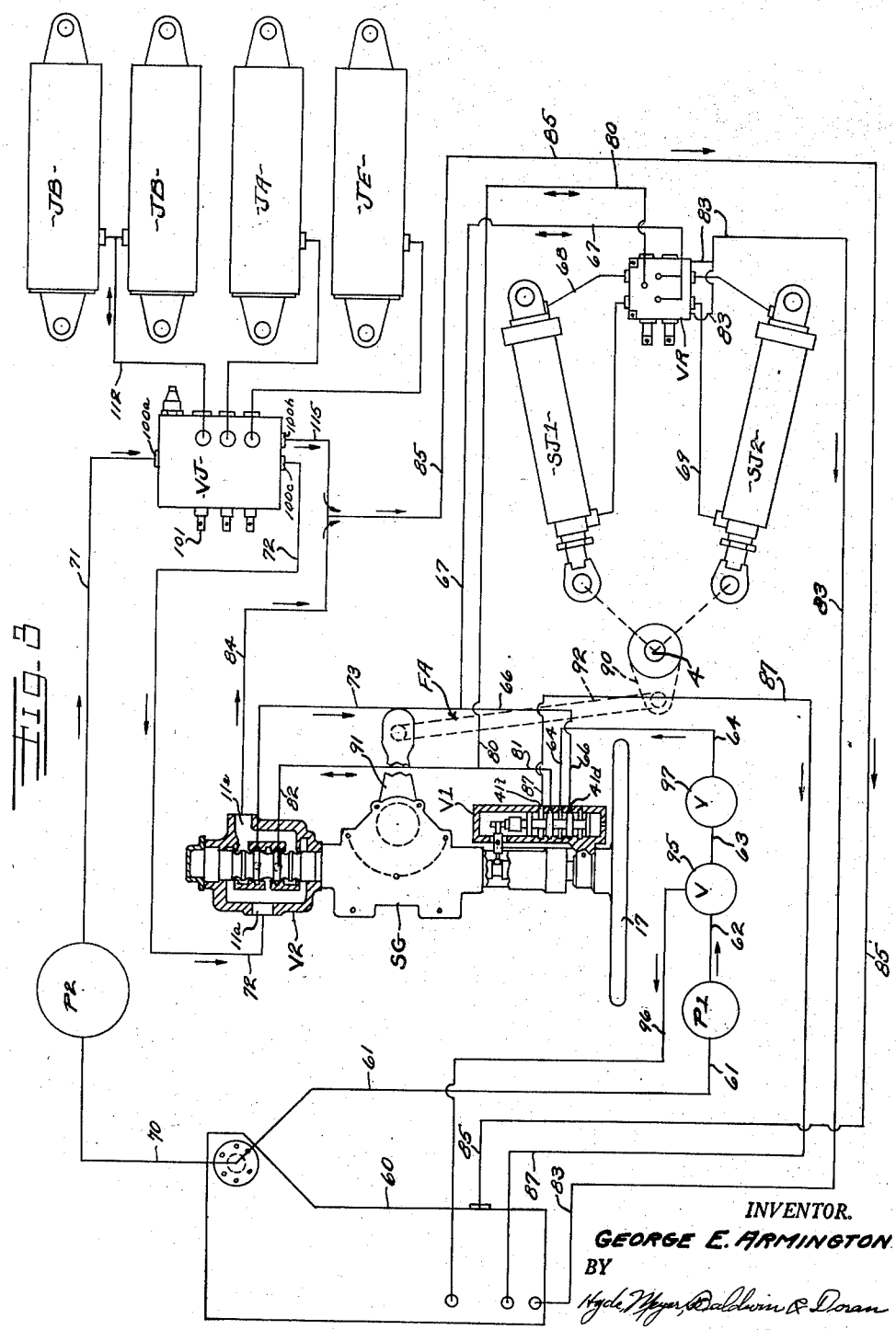

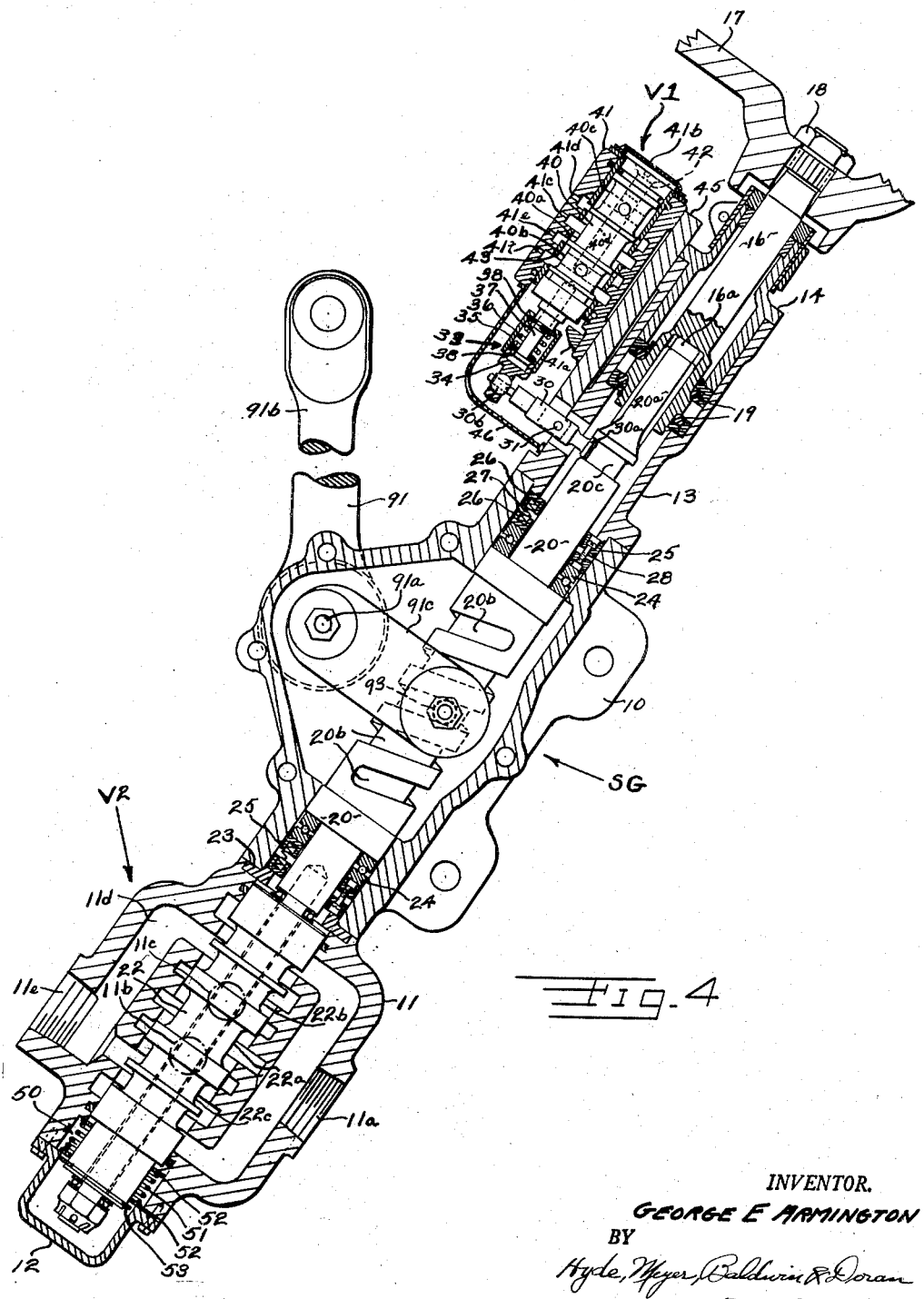

Dec. 9, 1958  G. E. ARMINGTON  2,863,234
TWO SPEED STEERING

Filed Sept. 14, 1954  7 Sheets-Sheet 6

INVENTOR.
GEORGE E. ARMINGTON
BY
ATTORNEYS

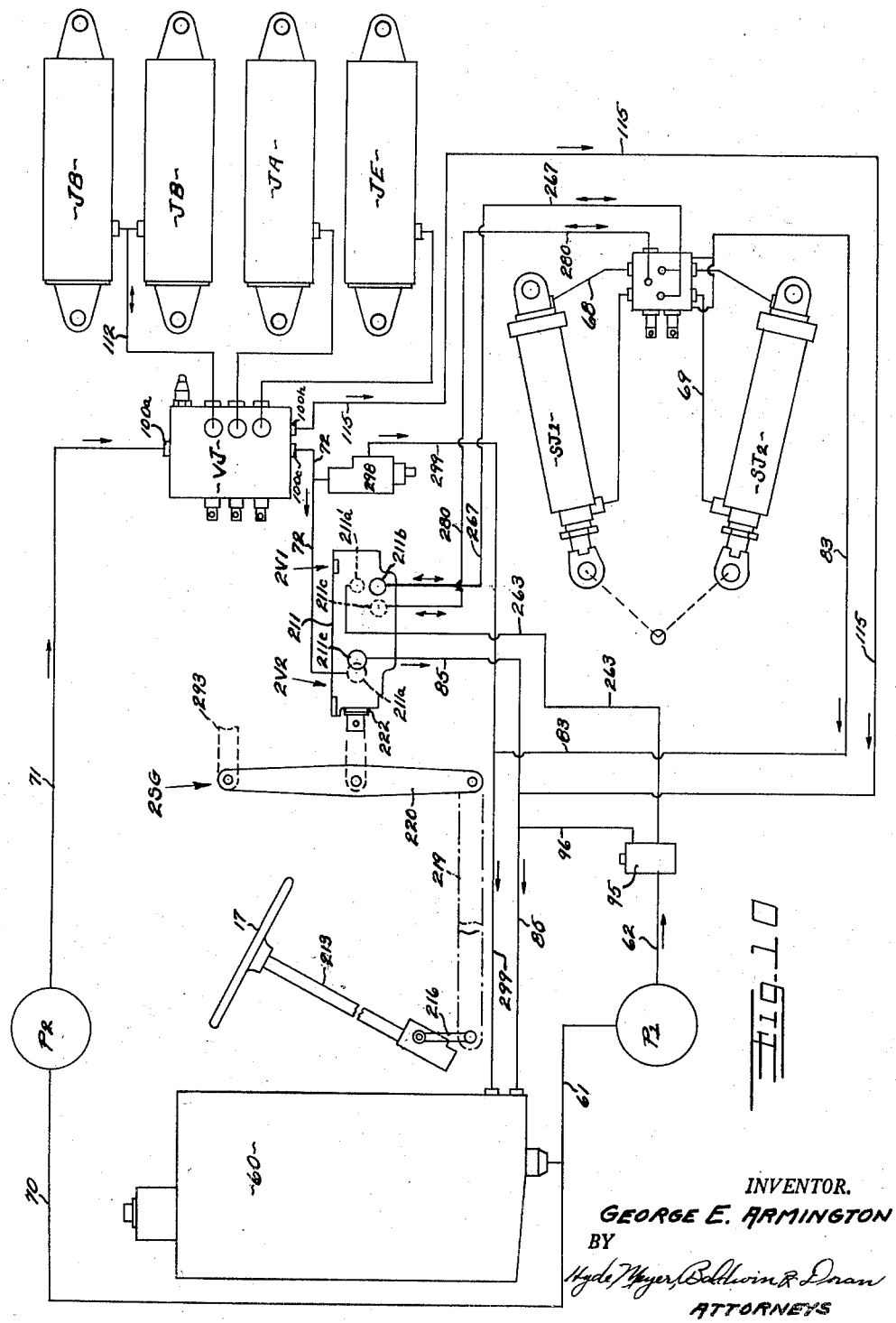

United States Patent Office 2,863,234
Patented Dec. 9, 1958

2,863,234

TWO SPEED STEERING

George E. Armington, Gates Mills, Ohio, assignor to General Motors Corporation, Detroit, Mich., a corporation of Delaware Application September 14, 1954, Serial No. 455,882

35 Claims. (Cl. 37—126)

This invention relates to improvements in a fluid pressure actuated system and more particularly to a system for two speed steering.

One of the objects of the present invention is to provide a fluid pressure actuated steering system for a vehicle with steerable wheels and providing slow steering, fast steering, light steering, and/or heavy steering whenever required.

Another object of the present invention is to provide a fluid pressure actuated system having one or more of the steering features mentioned in the previous paragraph and a fluid pressure actuated device therein always operable irrespective of the steering requirements.

Another object of the present invention is to provide a fluid pressure actuated steering system, as provided in any one of the preceding paragraphs, having a follower mechanism to provide natural steering with the angle of steer being directly proportional to the extent of motion of the operator-controlled element.

Another object of the present invention is to provide a two speed steering system characterized by its structural simplicity, its operating efficiency, and its coordination of operation with the other elements of the fluid pressure system.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 1 is a side elevational view of a digging and carrying scraper on which the present invention is especially adapted to be used;

Fig. 2 is a top plan view of a front portion of the scraper in Fig. 1 with the steering mechanism thereon;

Fig. 3 is a layout of the fluid system for operation of both steering and scraper jacks;

Fig. 4 is a longitudinal sectional view of the steering gear assembly shown in Figs. 2 and 3;

Fig. 5 is a longitudinal sectional view of the scraper jacks control valve shown in Fig. 3;

Figure 7:
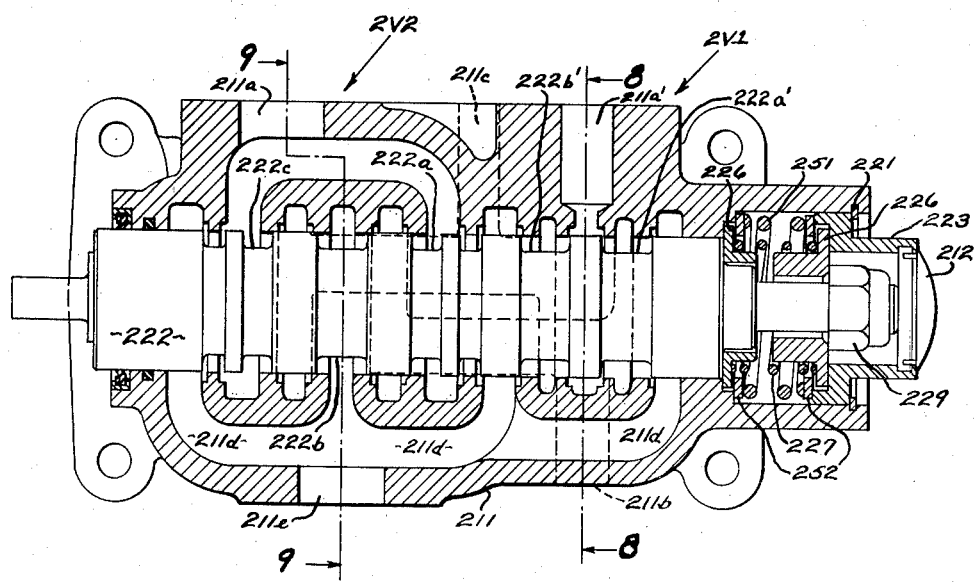
Fig. 7 is a longitudinal sectional view through the steering valve in Fig. 6 along line 7—7.
Figure 9:
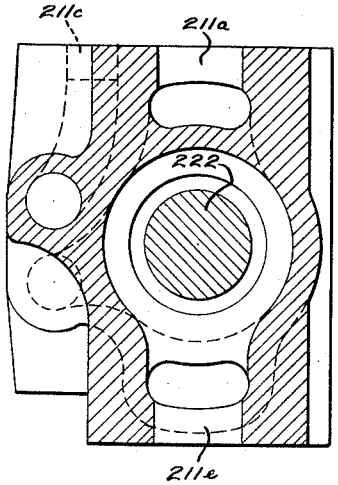
Figure 8:
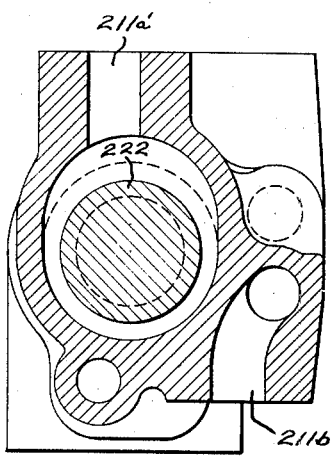

Figs. 8 and 9 are transverse sections along lines 8—8 and 9—9 respectively in Fig. 7; while Fig. 10 is a fluid system layout for this second inventive form.

Those familiar with this art will recognize that the present invention may be applied in many ways, but I have chosen to illustrate the first form (Figs. 1–5) in connection with a digging and carrying scraper more fully illustrated in Figs. 1 and 2 of the drawings, having all four wheels driven by the single engine in the rear, and more fully disclosed in my copending U. S. patent application, Serial No. 455,883, entitled, "All Wheel Drive Scraper" and filed September 14, 1954, and to illustrate the second form (Figs. 6–10) as having a tractor, with an overhung motor located to the right of the driver and driving the front wheels, substituted for the steerable frame member at the left in Fig. 1 (the rear motor may or may not be used as desired). However, it should be clearly realized that the present invention could be used on other type vehicles, such as trucks, etc., or wherever steering is important.

Since both forms have many features in common, they will both be described together with the same reference numbers being used throughout but a prefix "2" or a reference numeral in the "200" series will be used where possible with generally corresponding parts of a different construction in the second form.

In both forms of scrapers, there is provided a vehicle frame member 1 having a bowl supporting yoke with a steerable wheeled frame member, either member 2 (Fig. 1) or tractor member 202 (Fig. 6), pivotally connected thereto above a generally vertical steering axis 4. Each of the latter frame members has straddling wheels 3, 3 movable therewith to provide the steering operation. This member 2 or 202 and wheels 3 thereon are steered by a pair of steering jacks SJ1, SJ2 in Figs. 2, 3, 6 and 10 controlled by a reversing valve VR when each jack swings over center, as disclosed in my copending U. S. patent application, Serial No. 407,743, filed February 2, 1954, and entitled, "Power Steering Apparatus for Sharp Turning." These steering jacks and valve operate as a pressure fluid actuated steering motor of the expansion chamber type with the motor being responsive to the pressure fluid flow thereto.

Each form of scraper has a pair of bowl jacks JB, JB in Figs. 1, 3 and 10 for raising and lowering a scraper bowl 5 and an apron jack JA for raising and lowering scraper bowl apron 6. Each of these scraper jacks is operatively connected at its lower end to the scraper yoke 1 with the apron jack JA located between the two bowl jacks JB. An ejector jack JE in Fig. 1 dumps the scraper bowl load in the conventional manner. Each of these is a single acting jack of a pressure fluid actuated type located on the scraper. These scraper jacks operate in the same manner as those disclosed in my aforementioned U. S. patent application entitled, "All Wheel Drive Scraper," and in the copending U. S. patent application entitled "Digging and Carrying Scraper," Serial No. 287,772, filed May 14, 1952, by Edward R. Fryer and William J. Adams, now Patent No. 2,773,320, granted December 11, 1956.

It will be apparent as the description proceeds that the hydraulic flow systems in Figs. 3 and 10 will also have utility when these fluid jacks are replaced by other fluid actuated devices in other vehicles requiring steering. For example, either fluid diagram will have utility on a steered dump truck wherein elevating of the dumping body will be caused by a fluid jack at the same location in the circuit.

Figs. 1 to 10 of the drawings illustrate the position of the fluid pressure system parts when no steering is occurring and no pressure fluid is being admitted to or exhausted from scraper jacks JA, JB or JE. Wheels 3 are straight ahead in Figs. 1, 2, 3 and 10 but are steered fully to the right in Fig. 6.

The present invention provides a pressure fluid flow system for a steered digging and carrying scraper wherein the system has the following desirable features: (1) two speed steering so that the scraper can be slow steered (turned slowly) while the scraper is operating at high travel speeds but still can be fast steered (turned sharply and quickly) while traveling slowly even though the scraper driving motor drives the fluid pressure pump or pumps slower at slower scraper speeds so that the pump output is lower at slower speeds; (2) natural steering wherein the angle of steer is approximately directly proportional to the extent of steering wheel motion; (3) heavy or hard steering to overcome high steering resistance, such as in soft, rutty earth; (4) maximum wear life and maximum efficiency from each component by having each specifically adapted for the job that it is to perform, for example, each pump size is carefully chosen to operate at maximum efficiency; (5) the jacks or hoists on the scraper work under all conditions, and since they most frequently operate at slow steering, they use the fluid pressure normally provided for fast steering to simplify the hydraulic system; and (6) the jacks may operate at a higher pressure than the steering while getting pressure fluid from the same source.

Figure 6:
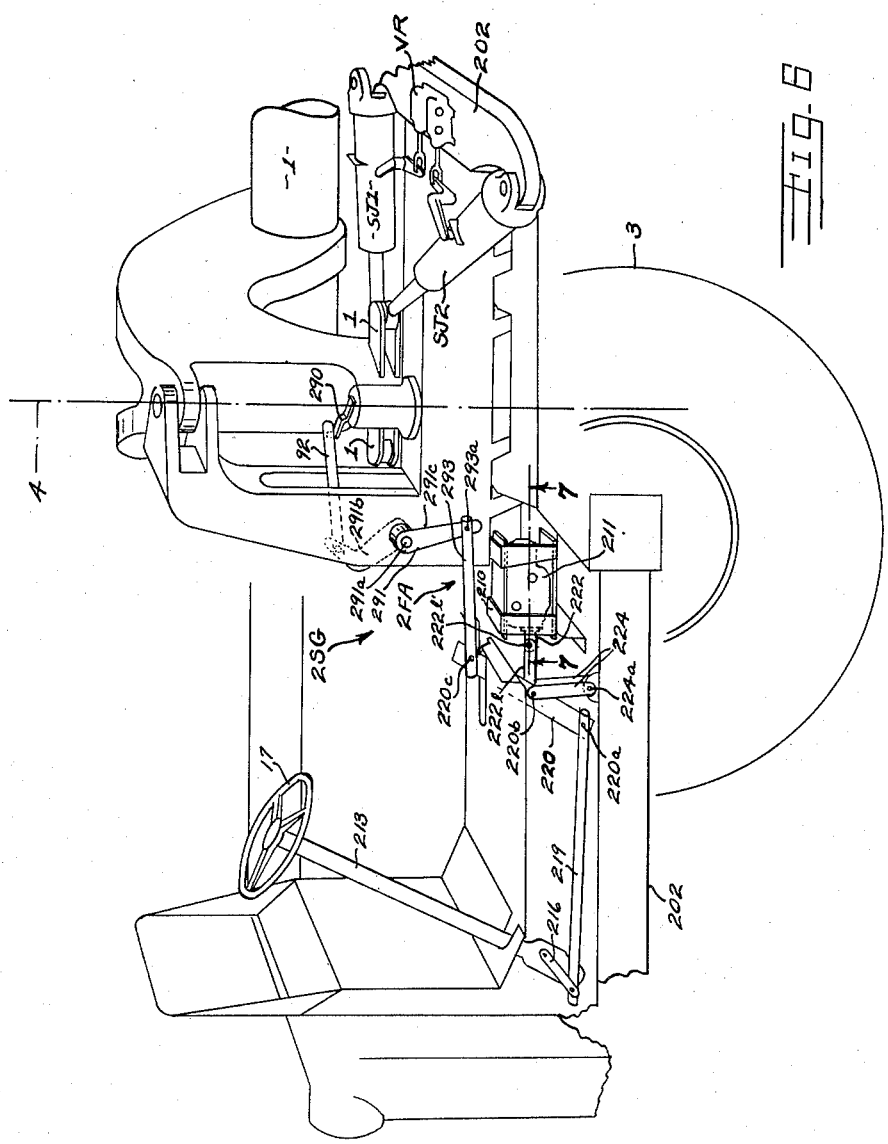
Fig. 6 is a perspective, cut-away view of a second inventive form on a different type scraper.

Figs. 3 and 10 also disclose many other basic components in addition to those already mentioned. Two independent fluid pressure sources, such as hydraulic pressure, are provided by the pumps P1 and P2. The pumps P2 have a larger fluid volume output and are capable of discharging fluid at a higher pressure than the pumps P1. For example, pumps P1 may have a fluid volume output of 7½ to 16 gallons per minute at a pressure of 500 to 1000 p. s. i. while pumps P2 may have a fluid volume output of 45 to 70 gallons per minute at a pressure of 1000 to 1500 p. s. i. It will be brought out in more detail hereinafter that pumps P1 provide the fluid for the slow steering, pumps P1 and P2 combine together to provide the fluid for the fast steering, and pumps P2 provide the fluid for the actuation of the jacks on the scraper. The steering gear assembly SG in Figs. 3 and 4 and 2SG in Figs. 6 and 10 provide the control for the slow and fast steering. They contain respectively steering valves V1, V2 and 2V1, 2V2 operatively connected respectively with the pumps P1 and P2 to control the slow and fast steering, and also contain portions of follower arm assemblies FA, 2FA operatively connected between the steerable wheels 3 and the main portion of the steering gear assemblies SG, 2SG to provide the follower function. Scraper jack control valves VJ are provided to receive flow from the high volume pumps P2 so as to supply fluid to or cut off fluid from these pump sources independently to any one of the three jack groups JA, JE, or JB in Figs. 3 and 10.

An examination of Figs. 3 and 10 will reveal that the steering valves V1, 2V1 are in the fluid pressure circuits from the pumps P1 and the steering valve V2, 2V2 and the control valves VJ are in the same fluid pressure circuits from pumps P2. However, it will be brought out in more detail that in this last circuit valves V2, 2V2 are in parallel with the valves VJ and with the latter being given preference for their fluid pressure demands over the valves V2, 2V2 so that jacks JA, JE or JB will always function.

Figs. 4 and 7 are longitudinally sectional views of steering gear assemblies SG, 2SG (including steering valves V1, 2V1 and V2, 2V2) with all of the valves in the fluid flow cutoff position, with wheels 3 steered straight ahead, and with no steering movement of the wheels occurring.

The assembly SG includes in Fig. 4 a central housing 10, a lower left end housing 11 forming the valve body of valve V2, a lower left end cap 12, an upper right end housing 13, and a sleeve 14 coaxially aligned and detachably connected together by any suitable means.

In Fig. 4, an operator-controlled rotatable steering element is provided. A rotatable shaft 16 has a steering wheel 17 fixed against rotation thereon and held in position by a nut 18. This shaft 16 has end thrust bearings 19 detachably secured thereto and located between the housing 13 and sleeve 14 to prevent endwise movement of the shaft 16 and operator-controlled steering wheel 17. A shaft 20, serving as part of the operator-controlled steering element, is coaxially aligned with the shaft 16, telescopically connected thereto by a splined or other suitable non-circular connection 16a, 20a so as to permit endwise motion of the shaft 20 while causing both shafts 16 and 20 to rotate together. This shaft 20 has a threaded portion 20b intermediate its ends and is detachably connected by a suitable stud and nut connection to a valve stem 22 extending through the valve body 11 of steering valve V2.

In the second inventive form in Figs. 6, 7 and 10, an operator controlled rotatable steering element is also provided. Steering wheel 17 is rotatably mounted on housing 213 to rotate by a shaft a worm gear fixed against axial movement within said housing 213. Bell crank 216, pivotally mounted on housing 213, has a projection on the end of its inner arm coacting with the threads of said worm and has its outer arm serving as a pitman arm connected by a universal ball joint to one end of drag link 219. This is basically the same type of construction as shown in Fig. 4 as connecting steering wheel 17 and arm 91b. A floating lever 220, serving as part of the operator-controlled steering element, is connected by universal ball joint 220a to the opposite end of drag link 219. The two steering valves 2V1, 2V2 are combined together in a single valve unit including a one piece body 211 rigidly mounted on frame member 202 by bracket 210 (Fig. 6) so as to provide access to all valve ports and having an endwise movable, one piece valve stem 222 telescoped therein to form both valves. A connecting link 222l is pivotally connected at opposite ends to valve stem 222 at 222l', and to floating lever 220 at 220b intermediate its ends. Lever 220 obtains its float by straddling links 224, 224 pivotally connected to link 220 at 220b and to frame 202 at pivot 224a.

Shaft 20 in Fig. 4 and valve stem 222 are always biased endwise toward a central position by centering spring assemblies located on opposite ends of the threaded portion 20b in Fig. 4 and at the right end of valve stem 222 in Fig. 7. In Fig. 4 a collar 23, held between housings 10 and 11, and bearings 24, 24 suitably locate the centering spring assemblies along with a shoulder on the left end of housing 13. Each centering spring assembly 25 includes axially spaced apart, coaxial sleeves 26, 26 operatively connected together not only to permit endwise movement but also to provide a stop against excessive separation therebetween by a plurality of circumferentially spaced bolts 28 with a plurality of circumferentially spaced compression springs 27 located between these bolts to normally bias these sleeves 26 to their outermost position. In Fig. 7, end ring 223 is held in valve body 211 by a snap ring 221 with its body bore closed by plug 212. Stop nut 229, screwed onto the right end of valve stem 22, holds in place compression spring 227 biasing apart annular flanged sleeves 226, 226 against shoulders on valve stem 222, valve body 211, end ring 223, and nut 229. Hence, the compression of springs 27, 227 normally tend to center shaft 20 and valve stem 222 and to exert a restoring force to move them toward the Fig. 4 and 7 positions whenever axial movement occurs in one direction or the other.

Follower members are provided to coact with the threaded portion 20b in Fig. 4 and with the upper end of floating lever 220 in the diagrammatic view in Fig. 6 and will be explained in more detail hereinafter. However, for the present, assume that a nut or pin 93 is fixed against axial movement, coacts with the threaded portion 20b in Fig. 4 and assume that link 293, connected by a universal ball joint 220c to lever 220, has its universal ball joint 293a fixed so it will not move relative to frame 202. Then, rotation of steering wheels 17 causes the valves V1, V2 and 2V1, 2V2 to operate sequentially with first the steering valve V1 and 2V1 operatively connected to the steering jacks SJ1, SJ2 for slow steering and then steering valves V1, V2 and 2V1, 2V2 both operatively connected to the steering jacks SJ1, SJ2 for fast steering. These fluid control valves V1, V2, 2V1, 2V2 independently supply or cut off fluid to the steering motor to provide a choice of steering speeds. Since the nut or pin 93 and joint 293a are fixed against movement, rotation of the steering wheels 17 will cause motion of shaft 20 and lever 220 so as to operate the valves V1, V2 and 2V1, 2V2 in the manner described.

The slow steering valves V1 and 2V1 open completely during the first end motions of shaft 20 and valve stem 222 for any given amount, for example, 1/32 of an inch, while the steering valves V2 and 2V2 remain fully closed because of the port construction and dimensions of the latter.

In Fig. 4, an arm 30, pivotally connected to the housing 13 by pivot pin 31, has a follower 30a at its lower right end coacting with a shaft groove 20c in the shaft 20 and has a ball and socket joint 30b at its upper left end coacting with valve stem 40 to provide endwise movement thereof. The relative lengths of the arm 30 on opposite sides of the pivot pin 31 indicate that the movement of shaft 20 is considerably magnified so that only a small movement of shaft 20 will cause considerable movement of the valve stem 40.

A push-pull spring assembly 33 operatively connects the ball and socket joint 30b and the valve stem 40. This assembly includes an inner sleeve 34 telescopically connected within an outer sleeve 35 and welded or otherwise secured thereto. A spring 36 has its opposite ends abutting against end washers 38, 38 located between end shoulders provided by these sleeves. A bolt 37 is screwed into the end of the valve stem 40 and extends through the central bore of the spring 36 and end washers 38. This spring 36 is strong enough so that it is not compressed when arm 30 moves the valve stem 40 but instead transmits the motion directly therebetween. However, the spring 36 does compress as soon as the valve stem 40 engages end stops provided at either of the opposite ends of its travel so that the spring 36 absorbs over travel of the arm 30 without damage to the valve stem. These end stops are provided by an end stop block 41a on the valve body 41 being engaged by valve stem 40 and a valve body end wall 41b being engaged by a screw 42 screwed into the right end of the valve stem 40.

The outer valve body 41 has a sleeve 43 telescoped therein and fixed against axial movement by the end wall 41b and suitable stop rings to provide the proper valve porting. This valve body 41 is suitably mounted on a base 45 secured to the housing 13 and has a housing 46 at its lower left end surrounding and protecting the operating linkage for actuating the valve stem 40.

If the steering wheels 17 are rotated further in the same direction so that more than 1/32 inch end travel occurs in shaft 20 and valve stem 222, steering valves V2 and 2V2 are also opened so as to provide with steering valves V1 and 2V1 the so-called fast steering. The end travel of shaft 20 is permitted by the connection 16a, 20a while steering wheel 17 does not move endwise or axially.

After the 1/32 inch endwise motion occurs, centering spring assemblies act on the lower left end of the valve stem 22 and the right end of valve stem 222 to bias them towards the flow cut-off or central position. In Fig. 4, the centering spring assembly 50 includes a centering spring 51 under compression and located between end stop washers 52, 52 with these washers abutting against shoulders provided within the lower left end housing 11 and cap 12. A washer 53, held on to the lower left end of the valve stem 22 by a nut and through stud, coacts with the washer 52 on the lower left while a shoulder on the valve stem 22 coacts with the washer 52 on the upper right to provide the centering operation. In Fig. 7, a compression type centering spring 251 biases apart washers 252, 252 against shoulders on valve body 211 and end ring 223 so as to coact with flanged sleeves 226 and the remainder of the previously described centering spring assembly during movement of valve stem 222 of a predetermined amount. It should be noted that there is about a 1/32 inch clearance on the outer side of each of these washers 52 and 252 to permit that amount of endwise movement before spring 51 and 251 are further compressed.

Greater force is required on the steering wheels 17 to open the valves V2 and 2V2 than the first valves V1 and 2V1. This provides operator feel of the increased force to turn the steering wheels before fast steering takes over.

Light spring means, including centering springs 27 and 227, are operative throughout the length of the endwise motion but only they have to be overcome during opening of valves V1 and 2V1. Stiffer springs 51 and 251 are operative only beyond the predetermined 1/32 inch limit of endwise motion, during the opening of valves V2 and 2V2, to provide the operator feel. It should be noted that both of these spring units surround the central shaft and valve stem assembly and normally bias them in a direction opposite to the motion which tends to move the valves V1, V2 and 2V1, 2V2 back to their flow cutoff position.

It will be apparent as the description proceeds that both valves V1, V2 and 2V1, 2V2 cause the wheels 3 to be steered in the same direction corresponding to the direction of turn of the steering wheels 17 during fast steering. A vehicle can be turned sharply and quickly by fast steering while it is traveling slowly and still can be turned slowly by slow steering when the vehicle is operating at high travel speeds. The steering gear assemblies SG and 2SG provide means for controlling both steering valves V1, V2 and 2V1, 2V2 to provide slow and fast steering. Pumps P1 are operatively connected by valve V1 and 2V1, in response to motions of shaft 20 and lever 220 below a predetermined limit, to the steering jacks SJ1, SJ2 and both valves V1, V2 and 2V1, 2V2 operatively connect both pumps P1 and P2 to the steering jacks SJ1, SJ2 for fast steering by high volume fluid flow when the shaft 20 and lever 220 have moved beyond the predetermined limit. The motion of shaft 20 takes the form of both rotational motion and axial or endwise motion.

When the steering wheels 17 are turned toward the right or clockwise with the operator looking down thereon from the upper right end thereof in Figs. 4 and 6, the wheels 3 will be correspondingly turned toward the right or clockwise in Fig. 2 as a result thereof by the flow controlled by one or both steering valves V1, V2 and 2V1, 2V2. This steering wheel movement will cause shaft 20 to move downwardly toward the left in Fig. 4 and cause valve stem 40 to move upwardly toward the right. Steering wheel movement in Fig. 6 causes drag link 219 to move endwise toward the left so as to move valve stem 222 in Fig. 7 toward the left. Steering valves V1 and 2V1 open and admit flow of pressure fluid, such as hydraulic fluid of the oil type, from the reservoirs 60 in Figs. 3 and 10 through the flow lines 61; through pumps P1; through flow lines 62, 63, 64 and 62, 263; valve body ports 41c and 211a'; toward the upper right in Fig. 4 along the valve stem annular groove 40a to emerge by port 41d and toward the right in Fig. 7 along valve stem annular groove 222a' to emerge by port 211b; and through flow lines 66, 67 and 267 to the reversing valves VR. Each reversing valve VR supplies fluid under pressure by flow line 68 to the right end of the steering jacks SJ1 and by flow line 69 to the left end of steering jack SJ2 in the manner described in the aforementioned copending application so as to expand the steering jack SJ1 and to contract the steering jack SJ2 when the wheels are in their straight ahead position shown with the jacks in the Figs. 2, 3 and 10 positions. This will cause the wheels 3 to be steered toward the right since steering jacks SJ1, SJ2 in Figs. 2 and 6 diverge rearwardly from the steering axis 4 with the left end of the jacks pivotally fixed to the vehicle frame member 1 while the right ends are pivotally fixed to the steerable wheeled frame member 2 or 202 having the wheels 3 so that expansion of steering jack SJ1 and contraction of jack SJ2 will cause a right turn when the jacks are in the Figs. 2, 3 and 10 positions.

Further rotation of steering wheels 17 toward the right will continue the axial movement of the shaft 20 toward the lower left in Fig. 4 and will continue the movement of lever 220 and valve stem 222 toward the left in Fig. 6 to cause steering valves V2 and 2V2 to open and also steer the wheels 3 toward the right. Fluid flow then occurs from the reservoirs 60 in Figs. 3 and 10 through the flow lines 70, pumps P2, flow lines 71, scraper jack control valves VJ in a manner to be explained in more detail hereinafter, and flow lines 72 into valve body ports 11a in Fig. 4 and 211a in Fig. 7. The fluid flows along the valve stem annular grooves 22a and 222a, now shifted toward the left from their Fig. 4 and 7 positions, and leaves valve V2 and 2V2 by the valve body ports 11b and 211b to connect by flow line 73 with the flow line 67 and by flow line 267 to the reversing valves VR in the same manner as previously described so that right turning will occur.

During right turning, the fluid from reversing valves VR returns by flow lines 80, 81, 82 and 280 to the steering valves V1, V2 and 2V1, 2V2. Any leakage endwise past the valve stems in reversing valves VR may return to the reservoirs 60 along flow lines 83 from ports in said valves. With the shaft 20 shifted toward the lower left, the returning flow in flow line 82 enters valve body port 11c, travels along valve stem annular groove 22b, travels along valve body passageway 11d so as to leave by the valve body port 11e. Then, the returning fluid in Fig. 3 travels along flow lines 84 and 85 back to the reservoir 60.

The fluid traveling back to steering valve V1 through the flow line 81 is also suitably returned to the reservoir 60. Valve stem 40 has been previously shifted toward the upper right from its Fig. 4 position so that the fluid entering by flow line 81 enters valve body port 41e to travel along valve stem annular groove 40b and then leaves the steering valve V1 by the valve body port 41f so as to return by flow line 87 to the reservoir 60.

In Fig. 10, the returning flow in line 280 enters port 211c, travels along valve stem annular grooves 222b and 222b', travels through valve body flow passageway 211d, leaves through valve body port 211e, and returns through the single return flow line 85 to reservoir 60.

When the steering wheels 17 are turned toward the left, the flow is reversed in flow lines 67, 80 and 267, 280 so that the steering jacks SJ1 contract in length and the steering jacks SJ2 expand in length when the wheels 3 and the steering jacks are in the positions shown in Figs. 2, 3 and 10 corresponding to wheels being straight ahead. Of course, the valve operation is also reversed since the shaft 20 moves upwardly toward the right upon movement of the steering wheel instead of downwardly toward the left while valve stem member 40 moves downwardly toward the left and since valve stem 222 now moves toward the right. Valve stem annular groove 22c in valve V2 now connects valve body passageway 11d and valve body port 11b while valve stem annular groove 22a connects valve body port 11a and valve body port 11c. In valve V1, valve stem annular groove 40a now connects valve body ports 41c and 41e while valve body port 41d is connected by a valve stem annular groove 40c, suitable radially extending passageways and through passageway 40d of the valve stem 40, and valve stem annular groove 40b with the valve body port 41f. In valves 2V1, 2V2, valve stem annular grooves 222b, 222a' now connects valve body passageway 211d and valve port 211b while valve stem annular grooves 222b' and 222c connect respectively ports 211a', 211c and 211a, 211c.

The follower arm assemblies FA in Fig. 3 and 2FA in Fig. 6 move the pin 93 or its equivalent nut, coacting with threaded portion 20b, axially in Fig. 4 and move universal pivot 293a in Fig. 6 in response to steering of the wheels 3 so as to tend to move the shaft 20 and valve stem 222 back to their central positions wherein both valves V1, V2 and 2V1, 2V2 are in their flow cutoff position. The follower arm assemblies FA and 2FA include an arm 90 swingable about the steering axis 4 and carried by steerable wheel frame member 2 and wheels 3 so as to be turned therewith on steering and an arm 290 fixed to vehicle frame member 1; an arm 91 in Figs. 3 and 4 and arm 291 in Fig. 6 having angularly displaced arms 91b, 91c and 291b, 291c connected together by shafts 91a and 291a with the shafts pivotally connected to the central housing 10 and frame member 202; connecting drag links 92 pivotally connected by ball type universal joints at opposite ends in Figs. 2, 3 and 6 to arms 90, 91b and 290, 291b; and a pin 93 and universal pivot 293a carried by the lower right ends of the arms 91c and 291c in Figs. 4 and 6. Pin 93 coacts with the threaded portion 20b in Fig. 4 by extending the full width between any two adjacent threads to operate in an equivalent manner to a nut. The arm 91b is shown in Fig. 4 in its true position corresponding to the construction in Figs. 1 and 2 but is shown schematically in Fig. 3 in an angularly displaced position for clarity of describing the operation thereof in Fig. 3. Hence, as the wheels 3 are turned toward the right, arms 90 and 290 will be turned clockwise relative to frame member 1 in Figs. 2 and 3 and counterclockwise relative to frame member 202 in Fig. 6 (looking down from the top); and arms 91b, 91c and 291b, 291c will turn counterclockwise in Figs. 3, 4 and 6 about the pivot shafts 91a and 291a so as to move the pin 93 and shaft 20 toward the upper right in Fig. 4 and to move link 293 and the top of lever 220 toward the right in Fig. 6 to return the valves V1, V2 and 2V1, 2V2 to their flow cutoff positions when the wheels have been steered the full amount measured by the extent of turn of the steering wheels 17.

Now it should be apparent that pin 93 and pivot 293a act substantially as stationary members so as to cause opening of valves V1, V2 and 2V1, 2V2 upon turning of the steering wheels 17 since the follower arm assemblies FA and 2FA remain substantially fixed in position until the wheels start to turn in steering. However, when the steering wheels 17 are turned to the full extent desired and wheels 3 are being steered in that direction by open valves V1, V2 and 2V1, 2V2, follower arms 91c and 291c will reverse the motions to shaft 20 and lever 220 originally imparted to them by the steering wheels 17 so as to first close the steering valves V2 and 2V2 as the wheels 3 approach the final positions and then close the steering valves V1 and 2V1 in response to approach of shaft 20 and valve stem 222 to the Fig. 4 and 7 positions as the wheels 3 assume positions corresponding to the motion originally imparted to the steering wheels 17. The springs 27, 36, 51 in Fig. 4 and 227, 251 tend to return the valves to the closed position to center the shaft 20 and valve stem 222 in their Fig. 4 and 7 positions.

The follower arm assemblies FA and 2FA and steering gear assemblies SG and 2SG constructions are designed so that the angle of steer or rotation of the steering wheels 17 is directly proportional to the extent of steering motion of the wheels 3 that will result therefrom. Providing the whole steering gear assembly SG in a compact construction and locating it on the scraper frame member 1 is desirable, so that relative movement between the scraper frame members 1 and 2 will not effect the natural steering action as might occur if an operating linkage were interposed between the steering wheel 17 and shaft 16 when each of these were carried on a different member and the linkage connected them. Steering gear assembly 2SG is similarly compactly located wholly on frame member 2.

As mentioned before, the pumps P1 have a lower quantity fluid output (for example, 7½ to 16 gals. per minute) and a lower maximum pumping pressure (500 to 1000 p. s. i.), and the pumps P2 have a higher quantity fluid output (45 to 70 gals. per minute) and a higher maximum pumping pressure (1000 to 1500 p. s. i.). Since most steering occurs at quite low fluid pressures, the pressure output from any pump is generally sufficient for average conditions. When only valves V1 and 2V1 are open, slow steering can take place by the low volume output pumps P1. If fast steering is desired (and the steering load is comparatively light in Fig. 3), both the valves V1, V2 and 2V1, 2V2 can be opened so that the output of the pumps P1, P2 are additive to accomplish fast steering response.

The control valves VJ in Figs. 3 and 10 are shown in more detail in Fig. 5. Since both the Figs. 3 and 10 constructions operate basically the same and have the same reference numerals, only the first will be described in detail.

In vehicles, such as a digging and carrying scraper, very little steering is usually required during loading or ejecting so that the small amount of steering required to keep the vehicle going straight during these operations is usually taken care of by the low volume output of pump P1 in Fig. 3 for slow steering. Then, high volume pump P2, also capable of operating at higher pressures, can be used for actuating the jacks JA, JB, JE in Fig. 3 on the scraper for loading or ejecting the load carried thereby. The control valve VJ for these jacks serves as a means for cutting off fluid flow to the steering valve V2 upon actuation of the control valve VJ to the fluid supply position for at least one of the jacks JA, JB, or JE.

Control valve VJ in Fig. 5 has a valve body 100 with valve stems 101, 102 and 103 adapted to reciprocate endwise therein by any suitable control linkage connectable to their left ends so as to control independently the fluid flow to and from the jacks JB, JA and JE in Fig. 3. The control valve VJ in the Fig. 5 position is neither supplying fluid to nor exhausting the scraper jacks; instead, the fluid is adapted to flow from flow line 71 in Fig. 3, directly through the control valve VJ and out flow line 72 so that normal fast steering can occur. The fluid from flow line 71 enters valve body port 100a, flows downwardly through the center of the valve through the valve body passageway 100b past and around the valve stems 101, 102 and 103 so as to exhaust through the valve body port 100c into the flow line 72 by means of the sleeve 105.

Each valve stem has a suitable centering spring arrangement so as to keep the valve stem in the Fig. 5 position when no axial force is exerted thereon. For example, the centering spring arrangement on valve stem 101 includes a compression spring 106 biasing apart sleeves 107, 107 with shoulders thereon normally abutting against the opposite ends of the spring 106, the inner face of a cap 108 secured to the valve body 100, the right face of the valve body 100, a head on a stud 109, and a shoulder on the right end of the valve stem 101. It should be apparent that whenever the valve stem is moved axially toward the right or toward the left, the compression spring 106 will exert a restoring force tending to move the valve stem 101 back to the Fig. 5 position.

Pressure fluid is supplied by the pump P2 to the bowl hoist JB when the valve stem 101 is moved, toward the left from the Fig. 5 position, until the annular valve stem flanges 101a and 101b respectively telescope within through bores 100d and 100c of the flow passageway 100b of the valve body member to block off flow to the steering valve V2. Then, ports 101c are aligned with downward flow in the valve body passageway 100b so that the fluid entering these ports can then travel toward the right through the bore, and when the fluid pressure becomes sufficiently great with respect to that found in the bowl jacks JB, the fluid will unseat the valve head 110 against the bias of the spring 111 so as to travel outwardly through the valve stem ports 101d, through a valve body passageway 100f, and through flow line 112 to the bowl jacks JB, JB in Fig. 3.

The jacks JB, JB in Fig. 3 are exhausted by moving the valve stem 101 axially toward the right until the valve stem ports 101c radially align with the valve body passageway 100f. Then, the weight of the scraper bowl, tending to contract the length of the bowl jacks JB, JB in Fig. 3, forces the fluid in the jacks back through the flow line 112, into the valve body port and valve body passageway 100f, into the valve stem ports 101c, axially along the hollow central passageway of the valve stem 101 toward the right, (when the pressure is sufficient to unseat the valve head 110) outwardly through the valve stem ports 101d, and downwardly through the valve body passageway 100g, out valve body port 100h, and to the reservoir 60 along flow lines 115 and 85 in Fig. 3. Having these fluid jacks JB of the single acting type exhaust directly back to the reservoir 60 lowers the exhaust pressure down to approximately the intake level of the pumps P1 and P2 so that no appreciable back pressure is exerted on these jacks during exhaust to interfere with their contraction. Hence, it is not desirable to cause the exhaust pressure of the jacks to flow through the steering valve V2 at this time to get faster steering because the back pressure would interfere with proper jack operation.

When the valve stem 101 is pushed toward the right from the Fig. 5 position for exhausting scraper bowl jacks JB, valve stem 101 does not cut off downward flow through the passageway 100b to the other valve stems and to the steering valve V2. The valve stem neck 101e is much longer than the corresponding neck on the right of the annular flange 101a so that flow is not cut off through the valve stem bore 100d and the fluid can flow downwardly through valve body passageway 100b from valve body port 100a to port 100c.

An adjustable pressure relief valve having a valve head 120 and a biasing spring 121 provides a bypass for the fluid from pump P2 back to the reservoir 60 when the operating fluid pressure to a jack JA, JB, or JE in Fig. 3 or the steering jacks SJ1 or SJ2 becomes too high. Then, the fluid entering valve body port 100a opens the valve head 120 against the bias of the spring 121 so as to flow downwardly through the valve body passageway 100g and to leave the valve by the valve body port 100h to return to the reservoir 60 by the flow lines 115 and 85.

The other valve stems 102 and 103 operate in basically the same manner except each has been provided with a lock mechanism for detachably holding it in the jack exhausting position since it is frequently desirable to operate the scraper apron or ejector with the weight thereof holding it down against suitable stops. An adapter 125 is screwed between the valve stem 102 and the bolt 109 and has diametrically aligned stop shoes 126, of cap formation, biased outwardly by a compression spring 127 so as to be detachably engageable in an annular lock groove 128 of the surrounding housing during exhausting of the apron jack JA. When a suitable force is exerted to pull the valve stem 102 toward the left, the shoes 127 will disengage from the groove 128 so that the centering spring 106 can return the valve stem 102 to its central position.

Relief valves 120, 121 (Fig. 5) in control valves VJ are adjustable and are generally set for 1400 p. s. i. and 1000 p. s. i. respectively in the Figs. 3 and 10 constructions so as to provide high pressure fluid for operating jacks JA, JB, JE while protecting pumps P2. However, these pressures are considerably higher than those normally required for steering so that relief valves 120, 121 are located upstream in passageways 100b (Fig. 5) from the blocking action by any of the valve stems 101, 102, 103 supplying fluid pressure to its associated jack.

Provision is made in the Fig. 3 construction for heavy or hard steering in soft, rutty, etc. soil whenever the steering load is no longer light and higher pressure is then required. A relief valve 95 in Fig. 3 operates at any desired setting, such as 600–1000 p. s. i. to provide a bypass back through flow line 96 to the reservoir 60 of the output from pump P1 whenever the steering load exceeds this relief valve setting and the maximum desirable operating pressure of pump P1. Also, the high pressure pump P2 is denied the outlet back through the pump P1 by the closure of the check valve 97 in Fig. 3, located between the control means or steering gear assembly SG and the low pressure source or pump P1. This check valve 97 can have any suitable setting, such as 600 p. s. i. Hence, during heavy or hard steering, when the steering load is comparatively heavy, only the high pressure source or pump P2 (at about 1400 and 1500 p. s. i.) is operatively connected by the steering gear assembly SG to the steering jacks SJ1, SJ2 even though both valves V1 and V2 are open. Of course, the volumetric fluid flow under heavy or hard steering conditions from only pump P2 will be greater than the fluid flow from only pump P1 during slow steering but less than the combined fluid flow from both pumps P1 and P2 during fast steering. Hence, the choice of volumetric and pressure capacities of pumps P1 and P2 and the design of the fluid flow circuit in Fig. 3 has each pump normally operating at maximum efficiency and with minimum wear so that a long and satisfactory wear life will result. When the heavy or hard steering load becomes too great, fluid output from pump P2 vents through the pressure relief valve in the control valve VJ back to the reservoir 60.

In Fig. 10, no separate provision is made for heavy or hard steering since both steering valves 2V1, 2V2 are supplied fluid at about the same pressure, for example 800 p. s. i. In Fig. 10, relief valves 95 in line 62 and 298 in line 72 are both set at the same pressure level to return fluid to reservoir 60 through flow lines 96 and 299 respectively so that check valve 97 in Fig. 3 is not needed.

Therefore, means is provided in both Figs. 3 and 10 for pressure relief by relief valves 120, 121 in valves VJ between the sources, pumps P2, and jacks JA, JB, JE at one level satisfactory for jack operation and by relief valves 95, 298 between the sources, pumps P1 and/or P2, and the steering motors at another level (lower level) to provide satisfactory steering.

Hence, in both inventive forms (Figs. 3 and 10), when the pressure fluid from the pumps P2 is admitted to the bowl jacks JB by the control valves VJ, slow steering can still occur because the steering jacks are supplied by the pumps P1 regardless of whether one or both valves V1, V2 and 2V1, 2V2 are open so that scraper actuation and steering can still occur simultaneously. Fluid from pumps P2 is blocked to the steering valves V2 and 2V2 only when fluid is being pumped into the jacks JA, JB or JE. Whenever one of these jacks is being exhausted or whenever the control valves VJ are in the Fig. 5 position (the position for retaining the fluid entrapped in the jacks), the steering valves V2 and 2V2 will obtain the full volume fluid flow from pumps P2 so that steering can operate in a normal manner. Then, the steering wheels 17 will control the steering gear assemblies SG and 2SG to give slow steering when valves V1 and 2V1 are open or fast steering when valves V1, V2 and 2V1, 2V2 are both open or hard or heavy steering at high fluid pressure in Fig. 3 when both of these valves are open and the need arises.

Since the flow system in both Figs. 3 and 10 are similar, corresponding parts may be interchanged. For example, the steering valves 2V1, 2V2 in Fig. 7 or steering gear assembly 2SG can be substituted for the corresponding parts in Fig. 3 and the resultant construction will operate in the same manner as Fig. 3 now operates.

Here are a few of the advantages arising from using the circuit in Fig. 3 or 10. First, since only slow steering at low fluid pressures is generally required during scraper jack actuation and since this is satisfied by pump P1, pump P2 with its high pressure and high volume output can be used to supply fast steering, hard steering, and scraper jack actuation with the scraper jack actuation having preference over the steering operations supplied by pump P2. Hence, slow steering, generally requiring low steering power, does not interfere with the operation of the scraper. Also, fast steering does not interfere with the scraper jack operation, but, however, when one of the scraper jacks is operated, then only slow steering is available. These advantages are obtained by having the steering valve V2 or 2V2 and the jack actuating valve VJ in the same fluid pressure circuit from pump P2 while the other fluid pressure circuits with pump P1 includes only the slow steering valve V1 or 2V1. Also, the valve V2 or 2V2 is connected in parallel in its circuit with its valve VJ and with the latter having preference over valve V2 or 2V2 whenever conflict occurs.

Second, the exhaust of the scraper jacks JA, JB or JE does not effect the supplying of fluid either to one or the other of these jacks or to the high speed steering because of the elongated neck on the valve stem, for example neck 101e on valve stem 101 in Fig. 5. Hence, the pump P2 can be utilized more efficiently since the exhausting of the jacks does not interfere with the flow of the pump fluid to perform one of the other operations.

Third, the jacks JA, JB and JE exhaust directly to the reservoir 60 so that no back pressure interferes with the operation of these single acting jacks.

Fourth, the jacks on the scraper are not connected in series with the fluid from the steering operation so that all steering operation fluid must go through the jacks and the jacks cannot obtain fluid that has not so traveled. Such a series construction also requires that the pump operate at a pressure equal to the sum total of the pressures required for steering and jack operation. However, in the present construction, the jacks are expanded to any degree independently of the quantity of fluid flowing through the steering valves and the highest pumping pressure is no greater than that required for either steering or jack operation.

Fifth, each pump is operating at maximum efficiency for long wear life and only two pumps are used for compact design. Since most steering is slow steering at low pressure, the steering load is most frequently thrown on the pump P1. This pump supplies fluid at a substantially lower pressure than required for hard steering in Fig. 3 and at a substantially lower pressure and in smaller volume than required for satisfactory scraper jack operation. Pumps P2 supply pressure fluid in sufficient volume for fast steering by valve V2 and 2V2, at sufficient pressure for hard steering, and in sufficient volume and at sufficient pressure for scraper jack operation. Hence, even though the jacks operate at a higher pressure than normal steering, they can be supplied with pressure fluid from the same source.

It should be clearly apparent that either hydraulic circuit can be used on other vehicles besides a digging and carrying scraper and any other suitable fluid actuated devices may be substituted for the scraper jacks JA, JB, and JE in Figs. 3 or 10. For example, a dump truck may utilize the two speed steering for the steering operation while the body dumping hoist could be controlled by the control valve VJ.

It has been found that the Fig. 10 construction is the preferred form of fluid circuit for scraper design because of the simplicity of its single valve unit construction in Fig. 7 and the close correspondence between its operational characteristics and preferred scraper operation.

Various changes in details and arrangement of parts can be made by one skilled in the art without departing from either the spirit of this invention or the scope of the appended claims.

What I claim is:

1. In a digging and carrying scraper, a pressure fluid actuated steering motor operatively connected to steerable wheels on said scraper for providing slow and fast speed steering, a pressure fluid actuated jack on the scraper, a fluid pressure source, fluid control valves operatively connected with said source and said motor and said jack for independently supplying or cutting off fluid from said source to the scraper jack and to the motor for each steering speed, said control valves including two steering valves operatively connected with said source and said motor and including a scraper jack actuating valve operatively connected with said source and jack, control means for controlling both steering valves to provide said slow and fast steering, at least one steering valve and the scraper jack actuating valve being in the same fluid pressure circuit from said source, and supply means for supplying pressure fluid to the scraper jack actuating valve independently of the supply to one of said steering valves, whereby scraper actuation and steering may occur simultaneously.

2. In combination, a two speed pressure fluid actuated steering motor for a vehicle, a pressure fluid actuated device, a fluid pressure source, fluid control valves operatively connected with said source and said motor and said device for independently supplying or cutting off fluid from said source to the device and to the motor for each steering speed, control means for controlling both steering valves to provide slow and fast steering, one fluid circuit from said source including one of said steering valves and another fluid circuit including the other of said steering valves and said fluid actuated device valve.

3. In the combination set forth in claim 2, said one steering valve being a slow steering valve and said other steering valve being a fast steering valve.

4. In the combination set forth in claim 2, said other steering valve and said fluid actuating device valve being connected in parallel in said other circuit.

5. In the combination set forth in claim 4, flow cut off means in said other circuit for cutting off flow to one of said valves in said other circuit upon movement of the other of said valves in said other circuit to fluid supplying position.

6. In the combination set forth in claim 5, wherein said last mentioned flow cut off means cuts off fluid for the fast steering when supplying fluid to the fluid actuated device.

7. In combination, a two speed pressure actuated vehicle steering motor, a pressure fluid actuated device, two independent fluid pressure sources, a first control means operatively connected with said sources and motor for connecting simultaneously in flow communication the two sources to said steering motor for fast steering by high volume fluid flow, and a second control means operatively connected with said sources and motor and said device for connecting in flow communication one pressure source to said steering motor for slow steering and for connecting in flow communication the other pressure source to said fluid actuated device.

8. In the combination set forth in claim 7, said second control means including device control means in the flow path to said device, the first control means being normally operative for establishing said flow communication, said device control means being movable between a device operative position and another position, and the second control means being operative for establishing said flow communication only in response to actuation of device control means to device operative position and blocking flow from said other pressure source to said steering motor.

9. In the combination set forth in claim 8, one of said sources is capable of discharging fluid at a higher pressure than the other.

10. In the combination set forth in claim 9, the high pressure source being connected in flow communication to said steering motor or to said fluid actuated device in response to actuation of said device control means, whereby said low pressure source supplies normal steering needs, said high pressure source supplies normal needs of said device and both sources combine to provide fast steering when said device is not being actuated.

11. In the combination set forth in claim 7, one of said sources has a larger fluid volume output than the other.

12. In the combination set forth in claim 11, said larger volume source being operatively connectable in flow communication with said device for operating said fluid actuated device during slow steering.

13. In the combination set forth in claim 7, said one pressure source being capable of supplying fluid at a lower operating pressure than the other, and this lower pressure being substantially less than the pressure required for actuation of said device.

14. In the combination set forth in claim 7, said pressure fluid actuated device comprising a single acting fluid jack, said jack having an exhaust pressure at approximately the intake level of one of said sources, whereby no appreciable back pressure is exerted on said jack to interfere with contraction thereof.

15. In combination, a two speed pressure fluid actuated vehicle steering motor, a high and a low pressure fluid source, said steering motor being operatively connected to said sources by a control means therebetween, said control means having means for connecting in flow communication both sources to said fluid motor at light load for fast steering and for connecting in flow communication only the high pressure source to the motor during hard steer operation, whereby wear on the low pressure source is reduced to a minimum.

16. In the combination set forth in claim 15, said last mentioned means including a check valve connected in flow communication between said control means and low pressure source to prevent back-up of high pressure to the low pressure source.

17. In combination, a steerable wheeled vehicle, an expansible chamber fluid motor operatively connected with said vehicle to steer it, two sources of pressure fluid supply for said fluid motor, controller actuated controlling means therefor operatively connected with said sources and motor and constructed upon limited motion of its controller for connecting said fluid motor in flow communication to one of said sources and upon additional motion of its controller for connecting said fluid motor in flow communication to both of said sources for producing a steering effect at two different rates, respectively, and follower means operatively connecting the steerable wheels and controller of said controlling means for reversing said motion to disconnect the sources from flow communication with said fluid motor as said wheels assume a position corresponding to said motion originally imparted to said controller of said controlling means.

18. In combination, a steerable wheeled vehicle, an expansible chamber fluid motor operatively connected with said vehicle to steer it, two sources of pressure fluid supply for said fluid motor, and controller actuated controlling means therefor operatively connected with said sources and motor and constructed upon limited motion of its controller for connecting said fluid motor in flow communication to one of said sources and upon additional motion of its controller for connecting said fluid motor in flow communication to both of said sources for producing a steering effect at two different rates respectively with the angle of steer being directly proportional to the extent of said motion.

19. In combination, a steerable wheeled vehicle having a vehicle frame member and a steerable wheeled frame member pivotally secured thereto, an expansible chamber fluid motor operatively connected with both frame members to steer said vehicle, two sources of pressure fluid supply for said fluid motor, and manually actuated controller type controlling means therefor operatively connected with said sources and motor and constructed upon limited motion of its controller for connecting said fluid motor in flow communication to one of said sources and upon additional motion of its controller for connecting said fluid motor in flow communication to both of said sources for producing a steering effect at two different rates respectively, said controlling means comprising an operatively connected valve means and said manually actuatable controller, both mounted on the same frame member so that relative movement between said frame members will not affect said operative connection.

20. In combination, a steerable wheeled vehicle, an expansible chamber fluid motor operatively connected with said vehicle to steer it, two sources of pressure fluid supply for said fluid motor, and controller actuated controlling means therefor operatively connected with said sources and motor and constructed upon limited motion of its controller for connecting said fluid motor in flow communication to one of said sources and upon additional motion of its controller for connecting said fluid motor in flow communication to both of said sources for producing a steering effect at a slower and faster rate respectively, a pressure fluid actuated device, and flow controlling means operatively connected with said device and said motor and at least one of said sources for blocking off flow to said fluid motor from said last mentioned one source and for connecting in flow communication said last mentioned one source to said device in response to actuation of device control means.

21. In combination, a steerable wheeled vehicle, an expansible chamber fluid motor operatively connected with said vehicle to steer it, two sources of pressure fluid supply for said fluid motor carried by said vehicle, one source of lower capacity than the other, an operator-controlled steering element carried by said vehicle, a first control means operatively connected with said source of lower capacity and said fluid motor and said element and responsive to motion of said element below a predetermined limit for causing connection in flow communication of said source of lower capacity to said fluid motor, a second control means operatively connected with said other source and said fluid motor and said element and responsive to motion of said element beyond said predetermined limit for causing connection in flow communication of the other of said sources to said fluid motor, and follower means operatively connecting the steerable wheels and said two mentioned control means for disconnecting the sources from flow communication with said fluid motor as said wheels approach a position corresponding to the motion imparted to said steering element.

22. In combination, a steerable wheeled vehicle, an expansible chamber fluid motor operatively connected with said vehicle to steer it, two sources of pressure fluid supply for said fluid motor carried by said vehicle, one source of lower capacity than the other, an operator-controlled steering element carried by said vehicle, a first control means operatively connected with said source of lower capacity and said fluid motor and said element and responsive to motion of said element below a predetermined limit for causing connection in flow communication of said source of lower capacity to said fluid motor, a second control means operatively connected with said other source and said fluid motor and said element and responsive to motion of said element beyond said predetermined limit for causing connection in flow communication of the other of said sources to said fluid motor, and means operatively connected to said two mentioned control means for causing the angle of steer to be directly proportional to the extent of motion by said steering element.

23. In combination, a steerable wheeled vehicle having a vehicle frame member and a steerable wheeled frame member pivotally secured thereto, an expansible chamber fluid motor operatively connected with both frame members to steer said vehicle, two sources of pressure fluid supply for said fluid motor carried by said vehicle, one source of lower capacity than the other, an operator-controlled steering element carried by said vehicle, a first control means operatively connected with said source of lower capacity and said fluid motor and said element and responsive to motion of said element below a predetermined limit for causing connection in flow communication of said source of lower capacity to said fluid motor, and a second control means operatively connected with said other source and said fluid motor and said element and responsive to motion of said element beyond said predetermined limit for causing connection in flow communication of the other of said sources to said fluid motor, said steering element and both said control means being mounted on the same frame member.

24. In combination, a steerable wheeled vehicle, an expansible chamber fluid motor operatively connected with said vehicle to steer it, two sources of pressure fluid supply for said fluid motor carried by said vehicle, and operator-controlled rotatable steering element carried by said vehicle and having an axially extending threaded portion thereon, a follower member operatively connected to the steerable wheels and to said threaded portion, a first control means operatively connected with one of said sources and said fluid motor and said element and responsive to endwise motion of said element below a predetermined limit for causing connection in flow communication of said one source to said fluid motor, and a second control means operatively connected with the other of said sources and said fluid motor and said element and responsive to endwise motion of said element beyond said predetermined limit for causing connection in flow communication of said other source to said fluid motor, whereby rotation of said steering element will cause said endwise motion when follower member movement is resisted by the position of the steerable wheels.

25. In the combination set forth in claim 24, an operator-controlled steering wheel fixed against axial movement and coaxial with said steering element, telescopically connected thereto and rotatably keyed therewith, whereby no endwise motion of said steering wheel occurs during steering.

26. In the combination set forth in claim 24, spring means surrounding said steering element and normally biasing it in a direction opposite to said motion to urge disconnection of said sources.

27. In the combination set forth in claim 26, said spring means comprising a light spring means operative throughout the length of endwise motion and a stiffer spring means operative only beyond said predetermined limit.

28. In combination, a steerable wheeled vehicle, an expansible chamber fluid motor operatively connected with said vehicle to steer it, two sources of pressure fluid supply for said fluid motor carried by said vehicle, an operator-controlled steering element carried by said vehicle, a first control means operatively connected with one of said sources and said fluid motor and said element and responsive to motion of said element in one direction below a predetermined limit for causing connection in flow communication of said one source to said fluid motor, and a second control means operatively connected with the other of said sources and said fluid motor and said element and responsive to motion of said element in said one direction beyond said predetermined limit for causing connection in flow communication of said other source to said fluid motor, and a follower member operatively connected to the steerable wheels and said element for moving said element in the opposite direction for causing said control means to disconnect flow communication between said sources and said fluid motor in response to turning of said wheels.

29. In the combination set forth in claim 28, wherein said steering element includes a floating lever pivotally connected at spaced points to both of said means, said follower member, and an operator-controlled steering link.

30. In the combination set forth in claim 28, wherein both of said means include a single valve unit comprising a one piece body and a one piece valve stem forming two valves with each controlling the flow communication from one of said sources to said fluid motor.

31. In combination, a steerable wheeled vehicle, an expansible chamber fluid motor operatively connected with said vehicle to steer it, two sources of pressure fluid supply for said fluid motor, and controller actuated controlling means operatively connected with said sources and motor including a valve unit having two valves independently controlling the flow communication between the respective sources and said motor with said controlling means constructed upon limited motion of its controller for connecting by one of said valves said fluid motor in flow communication with one of said sources and upon additional motion of its controller for connecting by the other of said valves said fluid motor in flow communication with the other of said sources, said valve unit including a one piece valve stem for both of said valves.

32. In combination, a pressure fluid actuated steering motor for a vehicle, a pressure fluid actuated device, a controller actuated control means operatively connected to said device and motor for controlling pressure fluid flow to said device and said motor with said controller being movable between first and second operative positions, a pressure fluid source operatively connected to said control means for supplying pressure fluid to said control means, said control means having a first operative position for said controller for supplying pressure fluid to said device and for blocking off flow to said motor and a second operative position for said controller for blocking off flow to said device and supplying pressure fluid to said motor, pressure relief means operatively connected with said source and said motor and said device for relieving pressure between said source and said device at one level satisfactory for device operation and for relieving pressure between said source and said motor at another level satisfactory for steering.

33. In the combination set forth in claim 32, another fluid pressure source operatively connected to said motor for supplying fluid pressure to said motor at said other level.

34. In the combination set forth in claim 33, flow control means operatively connected with said sources and motor for independently controlling flow from both of said sources to said motor to provide two speed steering.

35. In a wheel supported digging and carrying scraper, a pressure fluid actuated motor operatively connected to steerable wheels on said scraper for providing two speed steering, a pressure fluid actuated jack on the scraper, a scraper jack control means operatively connected to said jack, two fluid pressure sources with one of lower capacity than the other, an operator-controlled steering element carried by said scraper, a first control means operatively connected with said element and said source and said motor and responsive to motion of said element in one direction below a predetermined limit for causing connection in flow communication of said source of lower capacity to said fluid motor, and a second control means operatively connected with said element and said sources and said motor and responsive to motion of said element in said one direction beyond said predetermined limit for causing connection in flow communication of both of said sources to said fluid motor, a follower member operatively connected to the steerable wheels and to said element for moving said element in the opposite direction for causing said aforementioned control means to disconnect flow communication between said sources and said fluid motor in response to turning of said wheels, and flow control means operatively connected with one of said sources and said fluid motor and said jack for blocking off flow to said fluid motor from said last mentioned one source and for connecting said last mentioned one source in flow communication with said fluid actuated scraper jack in response to actuation of said scraper jack control means.

References Cited in the file of this patent

UNITED STATES PATENTS 2,583,197  Armington ———————— Jan. 22, 1952